M. DONDE.
Apparatus for Distilling and Rectifying-Spirits.

No. 153,056.

Patented July 14, 1874.

Witnesses
Chas. H. Smith
Harold Serrell

Inventor
Manuel Donde,
per
Lemuel W. Serrell
atty

UNITED STATES PATENT OFFICE.

MANUEL DONDÉ, OF MERIDA, MEXICO.

IMPROVEMENT IN APPARATUS FOR DISTILLING AND RECTIFYING SPIRITS.

Specification forming part of Letters Patent No. 153,056, dated July 14, 1874; application filed June 29, 1874.

*To all whom it may concern:*

Be it known that I, MANUEL DONDÉ, of Merida, in the State of Yucatan, Mexico, have invented an Improvement in Apparatus for Distilling and Rectifying, of which the following is a correct description:

In this apparatus the vapors from the still are received into a rectifying-column of peculiar construction, that serves to condense the watery portions and return them to the still, and allow the spirit-vapors to pass away to the condenser or through a vessel containing anise-seed or other flavoring material previous to reaching the condenser.

The peculiarity in the construction of my rectifying-column consists in a series of conical diaphragms with central vapor-tubes having scalloped upper edges and conical condensing-caps, that serve to separate the watery portions by condensation, such water running down the interior of the cone and dripping from the edge upon the conical diaphragm, and returning by a pipe to the still. In this manner the vapors are free to pass through the rectifying-column under very little pressure, and the apparatus is very compact, cheap, and efficient.

Figure 1:
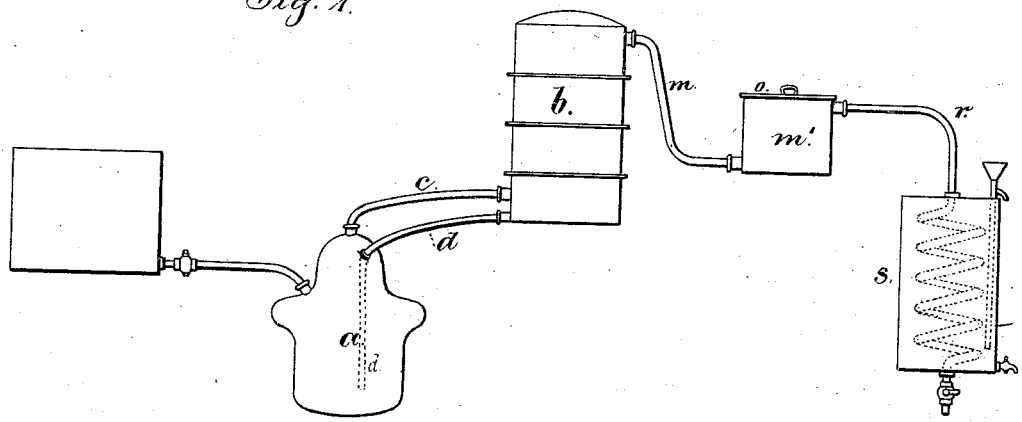
Figure 2:
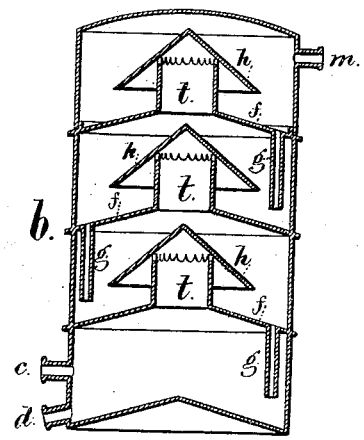
Figure 3:
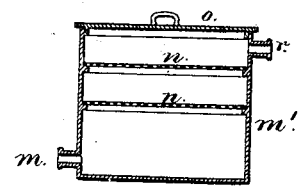

In the drawing, Figure 1 is an elevation of the apparatus complete. Fig. 2 is a section of the rectifying-column, and Fig. 3 is a section of the vessel containing the flavoring material.

The still $a$ is of usual construction; the vapor from the same passes to the column $b$ by the pipe $c$, and the water of condensation returns to the still by the pipe $d$, that passes down to the bottom of the still, or nearly so. The rectifying-column $b$ is made with conical diaphragms $f$. I prefer and use about twelve, but the number may be increased or lessened; and it is preferable to construct the same in sections that may be taken apart for cleaning. Each diaphragm $f$ is made with a short central tube, $t$, that is scalloped at its upper edge, and upon the same rests the cone $h$, that serves as a condenser to remove the watery portions of the vapor without condensing the spirit-vapor, and the watery particles drop from the lower edge of the cone upon the diaphragm $f$, and run by the pipes $g$ and $d$ back into the still $a$. The spirit-vapor passes away by the pipe $m$, and in the drawing it is represented as entering the lower part of the vessel $m'$, in which are perforated divisions $n$, upon which the anise-seed or other flavoring material is introduced. The removable cover $o$ is made entirely tight or sealed, and the vapors go by the pipe $r$ to the condenser $s$, which is of ordinary construction.

I claim as my invention—

The rectifying-column made of the conical diaphragms $f$, scalloped tubes $t$, and conical condensing-caps $h$, and return-pipes $g$ and $d$, substantially as and for the purposes set forth.

Signed by me this 3d day of June, A. D. 1874.

MANUEL DONDÉ.

Witnesses:
R. D. OTERO,
CLODORNIN SANSORES.